(12) United States Patent
Yoon (10) Patent No.: US 7,324,152 B2
(45) Date of Patent: Jan. 29, 2008

(54) CAMERA LENS ASSEMBLY FOR PORTABLE TERMINAL

(75) Inventor: Jong-Bom Yoon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 672 days.

(21) Appl. No.: 10/933,159

(22) Filed: Sep. 2, 2004

(65) Prior Publication Data

US 2005/0122419 A1   Jun. 9, 2005

(30) Foreign Application Priority Data

Dec. 3, 2003   (KR) .................. 10-2003-0087160

(51) Int. Cl.
*H04N 5/225* (2006.01)

(52) U.S. Cl. ................. 348/360; 348/373; 348/340

(58) Field of Classification Search ............. 348/360, 348/373, 340, 335, 218.1, 207.99; 455/556.1; 359/814
See application file for complete search history.

(56) References Cited

U.S. PATENT DOCUMENTS 6,141,052 A * 10/2000 Fukumitsu et al. ......... 348/373
6,639,625 B1 * 10/2003 Ishida et al. ............. 348/218.1
7,133,691 B2 * 11/2006 Kang ....................... 455/556.1
7,209,164 B2 * 4/2007 Nishimura et al. ...... 348/207.99

FOREIGN PATENT DOCUMENTS

CN    1391420    1/2003

* cited by examiner

Primary Examiner—Tuan Ho
Assistant Examiner—Asif Khokhar
(74) Attorney, Agent, or Firm—The Farrell Law Firm, PC (57) ABSTRACT

Disclosed is a camera lens assembly for a portable terminal. The camera lens assembly includes a spherical lens housing having a camera lens therein and formed at an outer peripheral portion thereof with a plurality of stopper dimples and an exposure window for exposing the camera lens, and a housing holder having a ring-shaped structure with a predetermined width circumferentially surrounding the lens housing, coupled to an inner portion of the portable terminal, and including at least one stopper engaged with the stopper dimples by receiving predetermined elastic force. The portable terminal has an opening for installing the exposure window and the housing holder is coupled to a peripheral portion of the opening. The lens housing rotates in a predetermined direction while being surrounded by the housing holder such that the stopper is engaged with the stopper dimple, thereby fixing the exposure window in a predetermined position of the opening.

9 Claims, 8 Drawing Sheets

FIG.9

CAMERA LENS ASSEMBLY FOR PORTABLE TERMINAL

PRIORITY

This application claims priority to an application entitled "Camera Lens Assembly For Portable Terminal" filed in the Korean Intellectual Property Office on Dec. 3, 2003 and assigned Serial No. 2003-87160, the contents of which are hereby incorporated by reference.

BACKGROUND OF THE INVENTION

1. Field of the Invention

The present invention relates to a portable terminal, and more particularly to a portable terminal having a camera lens assembly.

2. Description of the Related Art

Generally, portable terminals refer to electronic appliances allowing users to make wire/wireless communication with other terminals or base stations while carrying the portable terminal. Such portable terminals may include, among other things, cellular phones and PDAs. In addition, a main frame, a keyboard, a mouse, and a monitor of a personal computer may be classified as a terminal, even though they are not portable appliances.

As wireless communication has been developed, telephone communication has evolved from conventional wired telephones to wireless communication terminals, and now many features are offered including features such as wireless paging services and wireless character transfer or text messaging services. Most portable terminals now sold provide multi-media services, such as image communication services and moving picture transfer services, so that camera assemblies are now provided in such portable terminals, as standard features.

Figure 1:
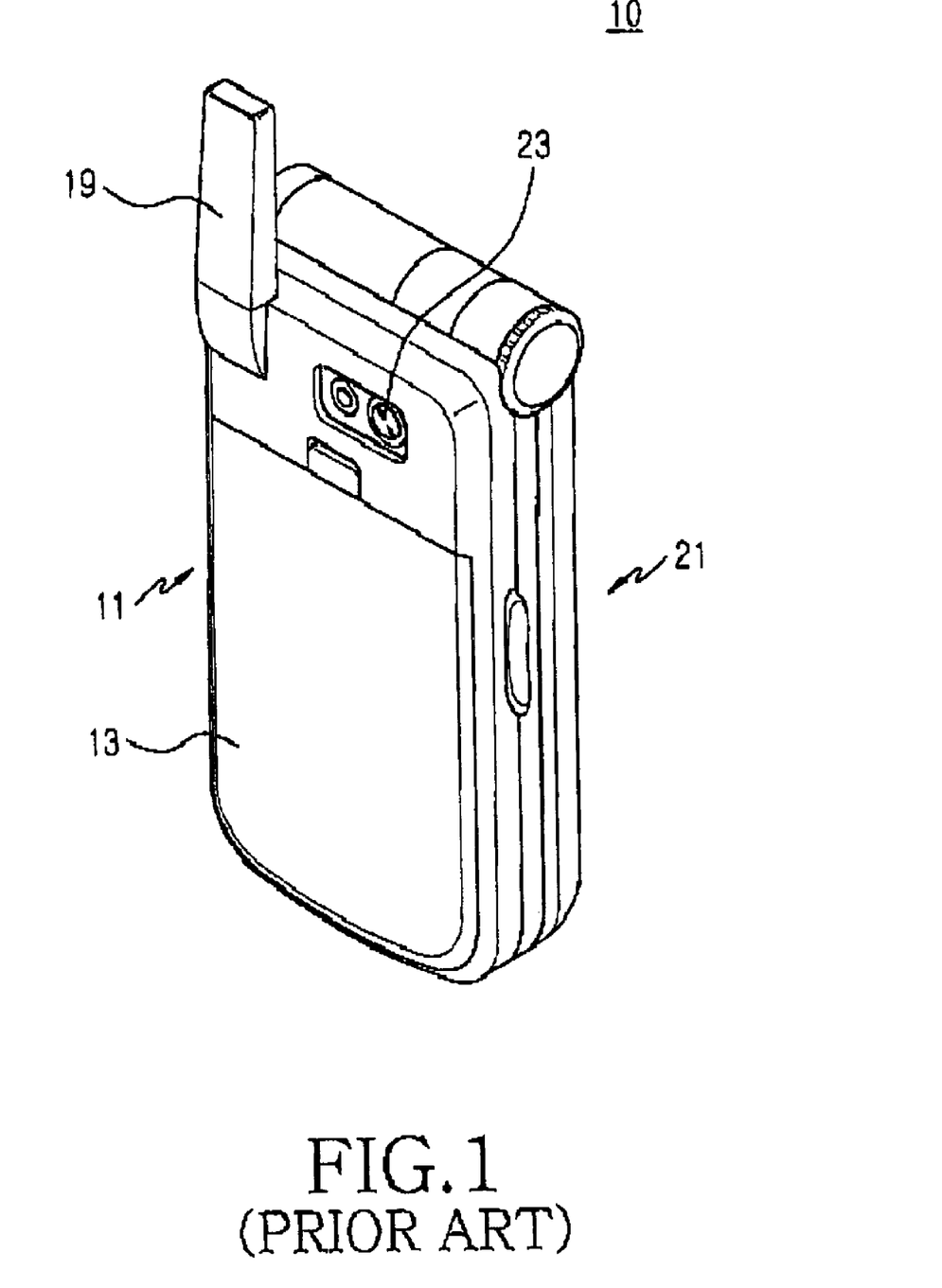
FIG. 1 is a perspective view showing a portable terminal having a conventional camera lens assembly.

FIG. 1 is a perspective view showing a portable terminal 10 having a conventional camera assembly. As shown in FIG. 1, the portable terminal 10 is a folder-type terminal including a body 11 and a folder 21 rotatably coupled to the body 11.

Although not illustrated in FIG. 1, a key pad and a signal transmitting section are provided in a front surface of the body 11 and a display unit and a signal receiving section are provided in the folder 21 in opposition to the front surface of the body 11. When the folder 21 is folded with regard to the body 11 as shown in FIG. 1, the portable terminal 10 is maintained in a call wait mode. In addition, when the folder 21 is rotatably moved away from the body 11, the mode of the portable terminal 10 is changed into a communication mode. At this time, a user can input data by using the key pad provided in the body 11 while observing an operational state of the portable terminal 10 through the display unit.

The camera lens assembly is accommodated in the body 11 of the portable terminal 11 in such a manner that an exposure window 23 is disposed at a rear portion of the camera lens assembly. A battery pack 13 is installed at a rear surface of the body 11 and an antenna 19 is provided at an upper end of the body 11.

Such a conventional camera lens assembly of the portable terminal may include a stationary camera lens having an exposure window installed at an outer surface of the folder or at an outer portion of the body so that photography may be carried out at only one camera angle, or a rotary camera lens rotatably installed at a side or an upper end of the portable terminal so that photography may be carried out at various camera angles.

The camera lens assembly shown in FIG. 1 includes the stationary camera lens installed in the body 11 such that the exposure window 23 is positioned at a rear upper portion of the body 11. In order to take a photograph by using this type of camera lens assembly, the user must open the folder 21 and set a photographing menu by using the key pad of the body 11.

However, although the stationary camera lens offers protection against external impact because the stationary camera lens is recessed into the portable terminal, the stationary camera lens cannot photograph a subject at various camera angles since the stationary camera lens is fixedly installed in the portable terminal. In contrast, the rotary camera lens is installed in a lens housing which is separate from and rotatably coupled to a side or an upper portion of the portable terminal. As such, the rotary camera lens can photograph a subject at various camera angles. However, the lens housing in which the rotary lens is installed is exposed to the exterior of the terminal, so the lens housing may be damaged if external impact is applied thereto.

SUMMARY OF THE INVENTION

Accordingly, the present invention has been made to solve the above-mentioned problems occurring in the prior art, and an object of the present invention is to provide a camera lens assembly for a portable terminal capable of photographing a subject with various camera angles and while providing superior protection against external impact.

To accomplish the above object, there is provided a camera lens assembly for a portable terminal, the camera lens assembly including a lens housing preferably of spherical shape having a camera lens therein and formed at an outer peripheral portion thereof with a plurality of stopper dimples and an exposure window for exposing the camera lens; and a housing holder preferably having a ring-shaped structure circumferentially surrounding the lens housing, coupled to an inner portion of the portable terminal, and including at least one stopper engaged with the stopper dimples as a result of a predetermined elastic force, wherein the portable terminal has an opening for installing the exposure window, the housing holder is coupled to a peripheral portion of the opening, and the lens housing rotates in a predetermined direction while being surrounded by the housing holder such that the stopper engages the stopper dimples, thereby fixing the exposure window in the opening.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, the same reference numerals are used to designate the same or similar components, and a detailed description of known functions and configurations incorporated herein will be omitted when it may make the subject matter of the present invention unclear.

Figure 2:
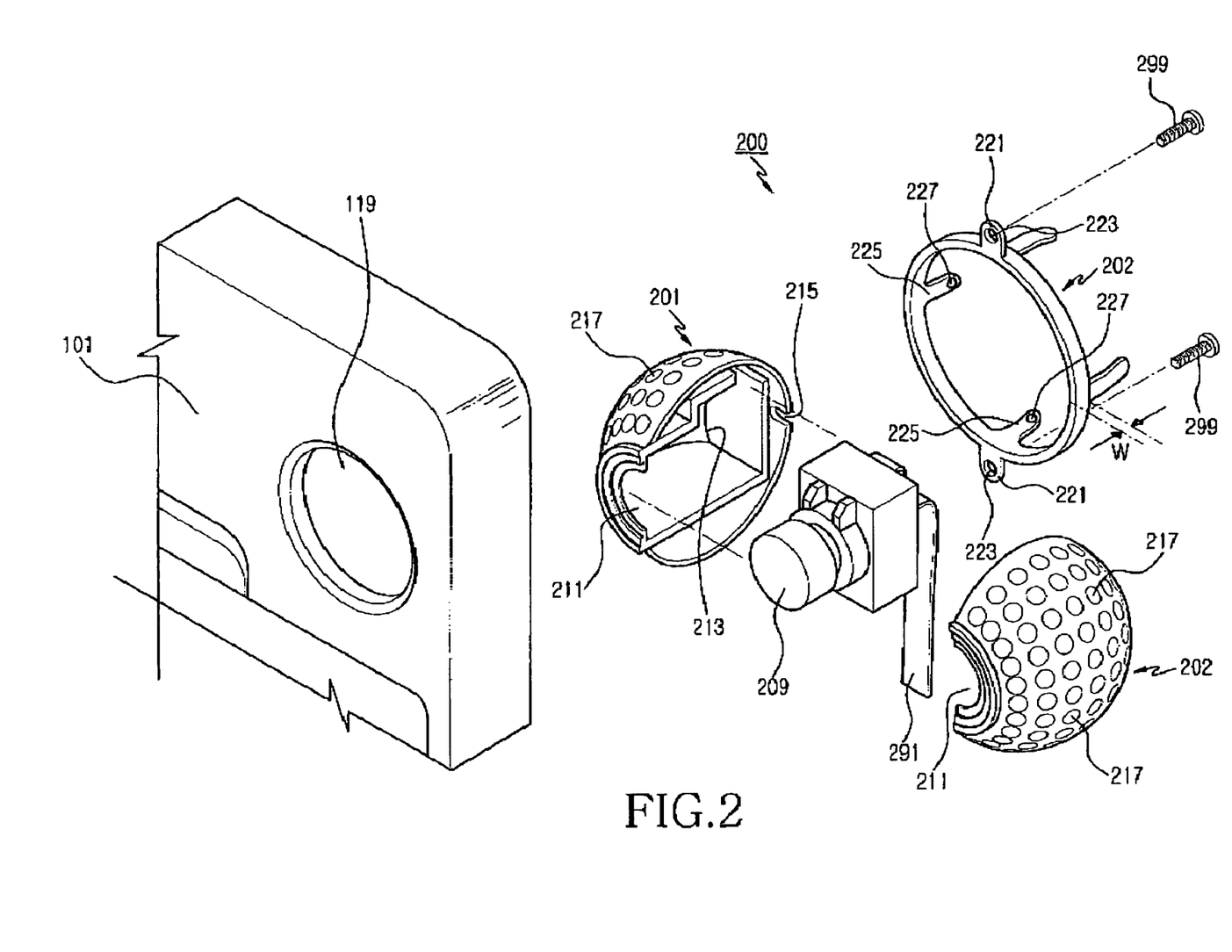
FIG. 2 is an exploded perspective view showing a camera lens assembly of a portable terminal according to an embodiment of the present invention.
Figure 3:
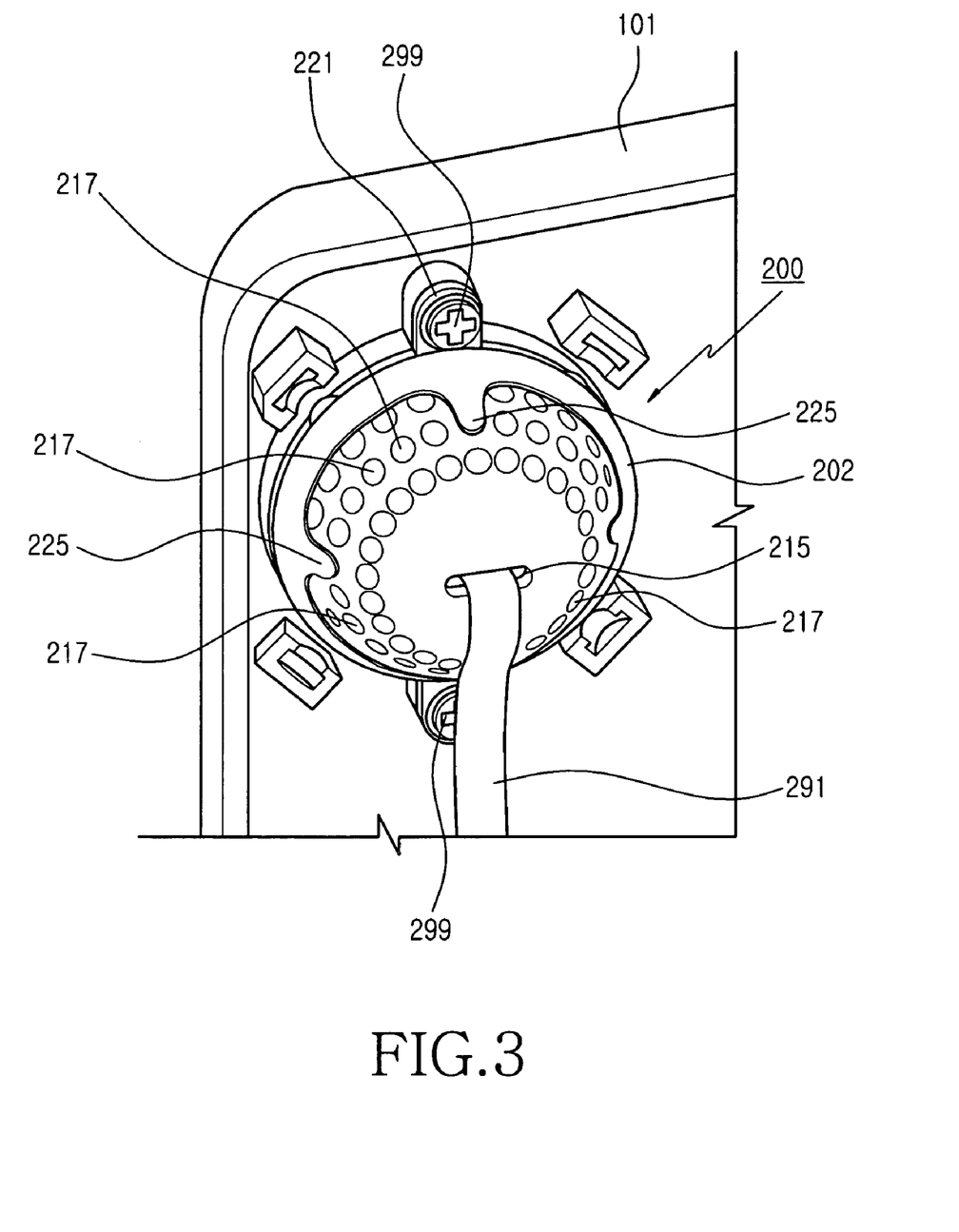
FIG. 3 is an assembled perspective view of a camera lens assembly shown in FIG. 2.
Figure 4:
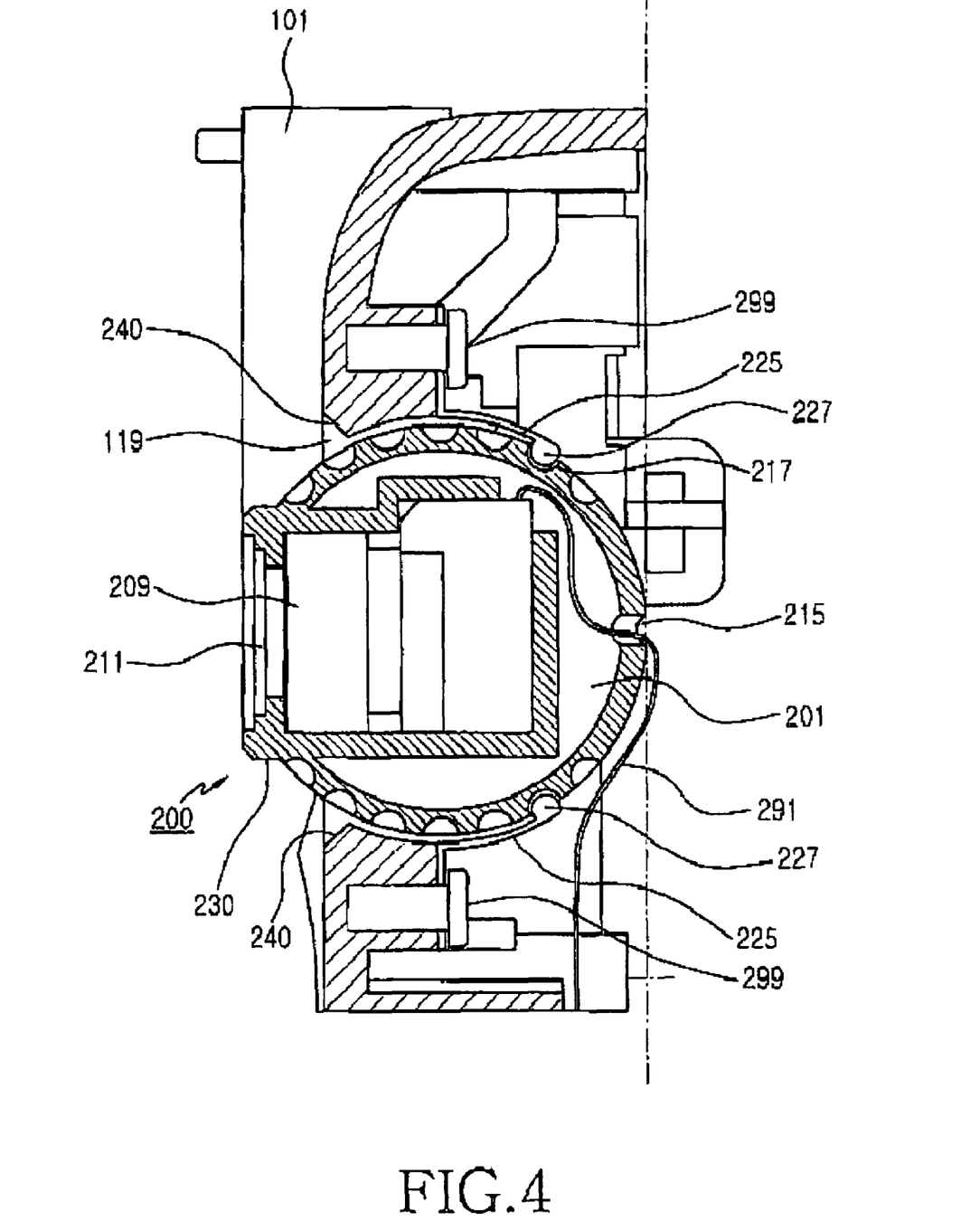
FIG. 4 is an assembled cross-sectional view of a camera lens assembly shown in FIG. 2.
Figure 5:
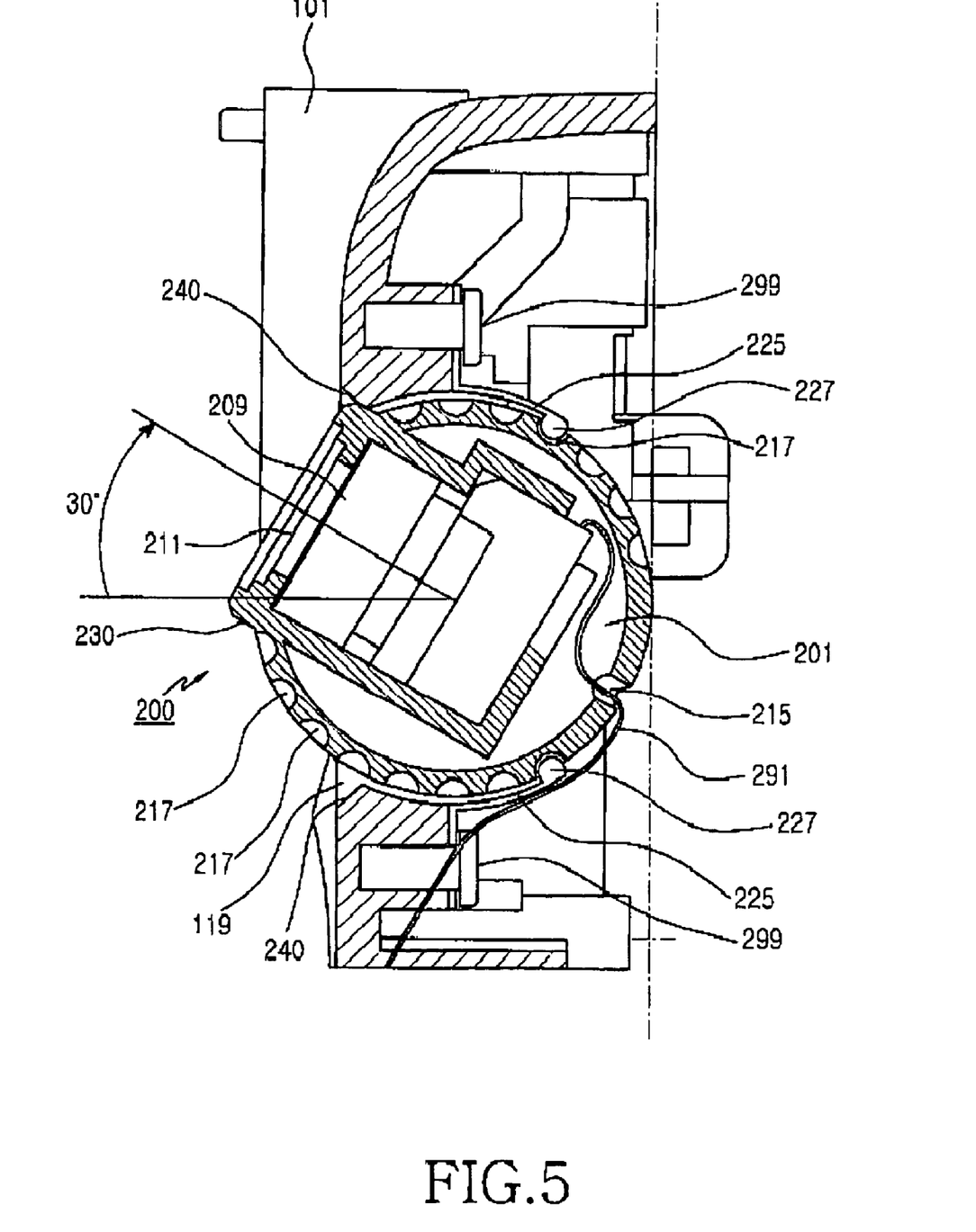
FIG. 5 is an assembled cross-sectional view showing a rotational state of a camera lens assembly shown in FIG. 2.

FIG. 2 is an exploded perspective view showing a camera lens assembly 200 of a portable terminal 101 according to an exemplary embodiment of the present invention, FIG. 3 is an assembled perspective view of the camera lens assembly 200 shown in FIG. 2, and FIGS. 4 and 5 are assembled sectional views of the camera lens assembly 200 shown in FIG. 2. As shown in FIGS. 2 to 5, the camera lens assembly 200 of the portable terminal 101 of the present invention includes a lens housing 201 and a housing holder 202. The camera lens assembly 200 is accommodated in the portable terminal 101 such that an exposure window 211 of the camera lens assembly 200 is positioned in an opening 119 formed in the portable terminal 101, preferably the rear side of the terminal 101.

The lens housing 201 preferably has a spherical shape capable of receiving a camera lens 209 and has formed at an outer peripheral portion thereof the exposure window 211 and a plurality of stopper dimples 217. The camera lens 209 includes a flexible printed circuit board 291 connected to circuitry of the portable terminal 101 and is positioned in a recess 213 formed in the lens housing 201. The exposure window 211 preferably is a circular hole designed to accommodate the camera lens 209. Preferably, the exposure window 211 is covered with a transparent cover (not shown) made of glass or plastic such as acryl. Preferably, the stopper dimples 217 are circumferentially aligned at an outer surface of the lens housing 201 while forming a plurality of concentric patterns about the exposure window 211. In addition, the lens housing 201 has a slit 215 to allow passage of the flexible printed circuit board 291. The slit 215 is formed in opposition to the exposure window 211, thereby providing a passage for the flexible printed circuit board 291 for ease and convenience of assembly, lens housing 201 is preferably constructed of two halves.

The housing holder 202 has a substantially ring-shaped structure having a predetermined width and circumferentially surrounding an outer peripheral portion of the lens housing 201. The housing holder 202 is coupled with an inner portion of the portable terminal 101. That is, the lens housing 201 is positioned in the opening 119 while being partially surrounded by the housing holder 202. The housing holder 202 has tabs 221 extending from an outer peripheral portion of the housing holder 202 in a radially outward direction of the lens housing 201. The tabs 221 are formed with coupling holes 223 so that the housing holder 202 can be screw-coupled with the inner portion of the portable terminal 101 by means of screws 299. The housing holder 202 is further provided with a plurality of stopper protrusions 227 located at the ends of elastic members 225, such that the protrusions 227 engage the stopper dimples 217. The housing holder 202 has at least one elastic member 225 extending so as to circumferentially surround the lens housing 201, and the stopper protrusion 227 is formed on an end portion of each elastic member 225. The elastic member 225 applies a bias force towards and against an outer peripheral surface of the lens housing 201. Therefore, the stopper protrusions 227 engage the stopper dimples 217 by means of the bias force of the elastic member 225.

Figure 6:
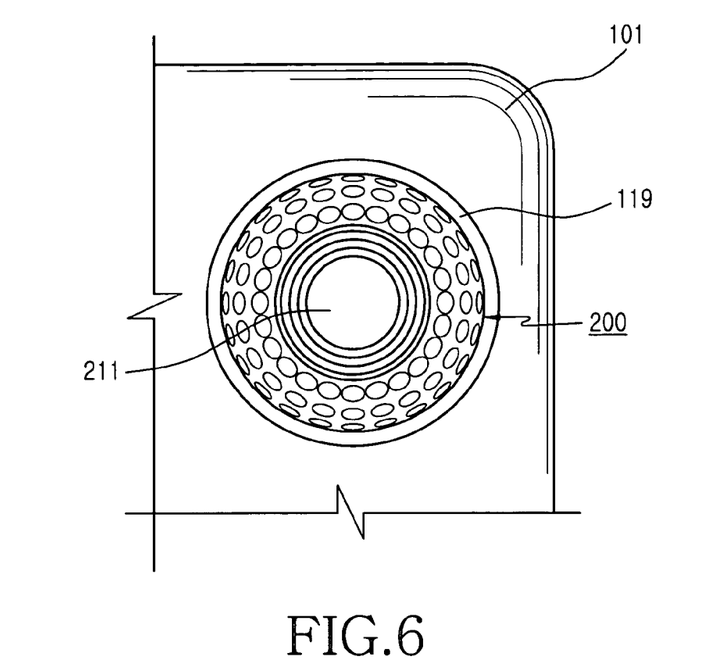
FIGS. 6 to 8 are front views showing rotational states of a camera lens assembly shown in FIG. 2.
Figure 7:
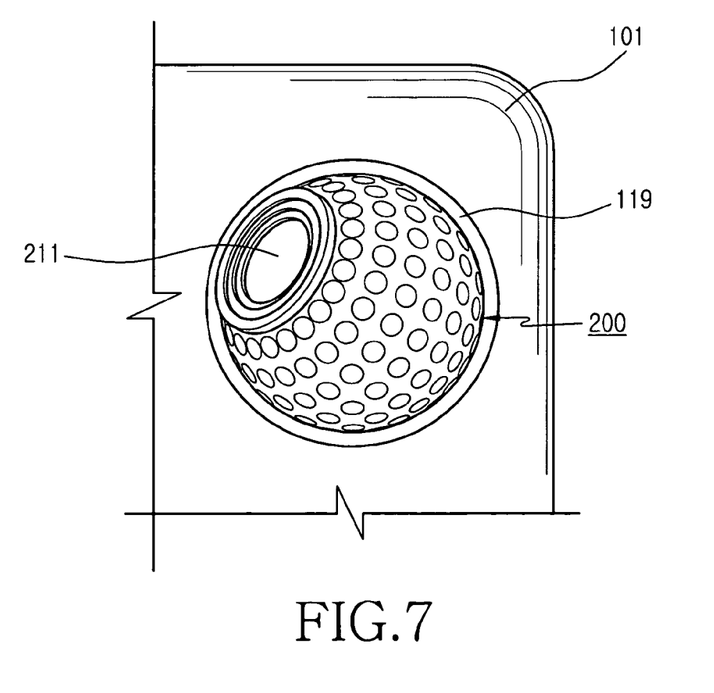
Figure 8:
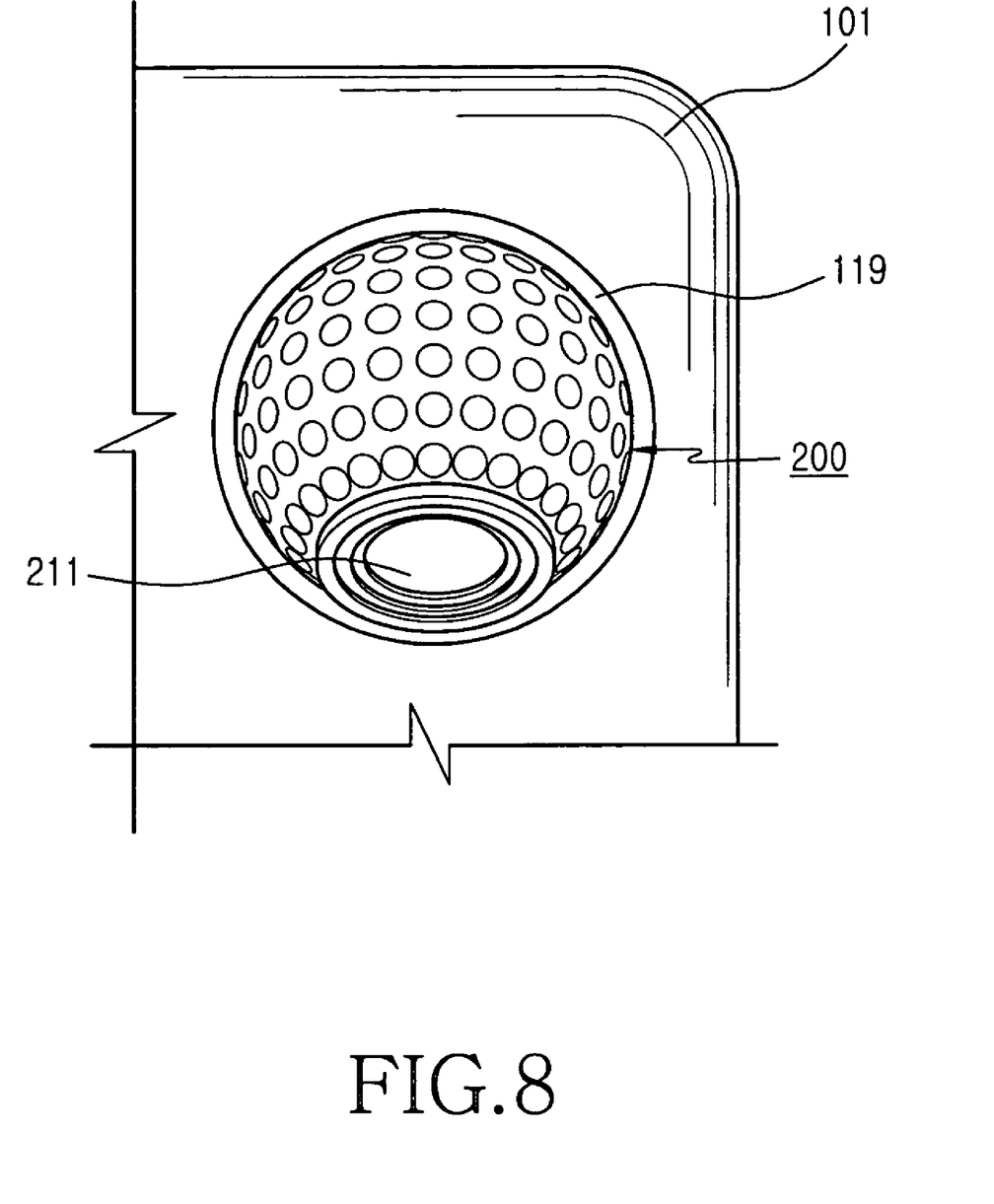

Referring to FIGS. 4 and 5, only a small portion of the outer peripheral surface of the lens housing 201 is positioned within the opening 119, while a larger portion of the lens housing 201 is positioned within the housing holder 202 in such a manner that the lens housing 201 can rotate in the opening 119 of the portable terminal 101. That is, the lens housing 201 is rotatably positioned in the opening 119 to provide a range of movement for the exposure window 211. According to the exemplary embodiment of the present invention, the exposure window 211 can rotate by approximately 30° in any direction about a center of the opening 119, as shown in FIGS. 6 to 8.

The lens housing 201 can rotate in a predetermined range within the opening 119, and movement is limited by outer wall 230 of exposure window 211 abutting against the bevelled surface 240 of opening 119.

In use, if a user rotates the lens housing 201 in order to take a photograph, the stopper protrusions 227 engage with the stopper dimples 217 so that the lens housing 201 is prevented from rotating. Accordingly, the user can stably fix the position of the lens housing 201 by using the camera lens assembly 200 in such a manner that a photograph can be easily taken in various camera angles. In addition, since the stopper protrusions 227 are engaged with the stopper dimples 217 by means of the biasing force of the elastic members 225, the user feels an improved click-stop sensitivity when the stopper protrusions 227 engage with the stopper dimples 217. The improved click-stop sensitivity derived engagement of the stopper protrusions 227 and the stopper dimples 217 repeatedly occurs whenever the user rotates the lens housing 201 so that the user may easily recognize a rotation angle of the lens housing 201.

Figure 9:
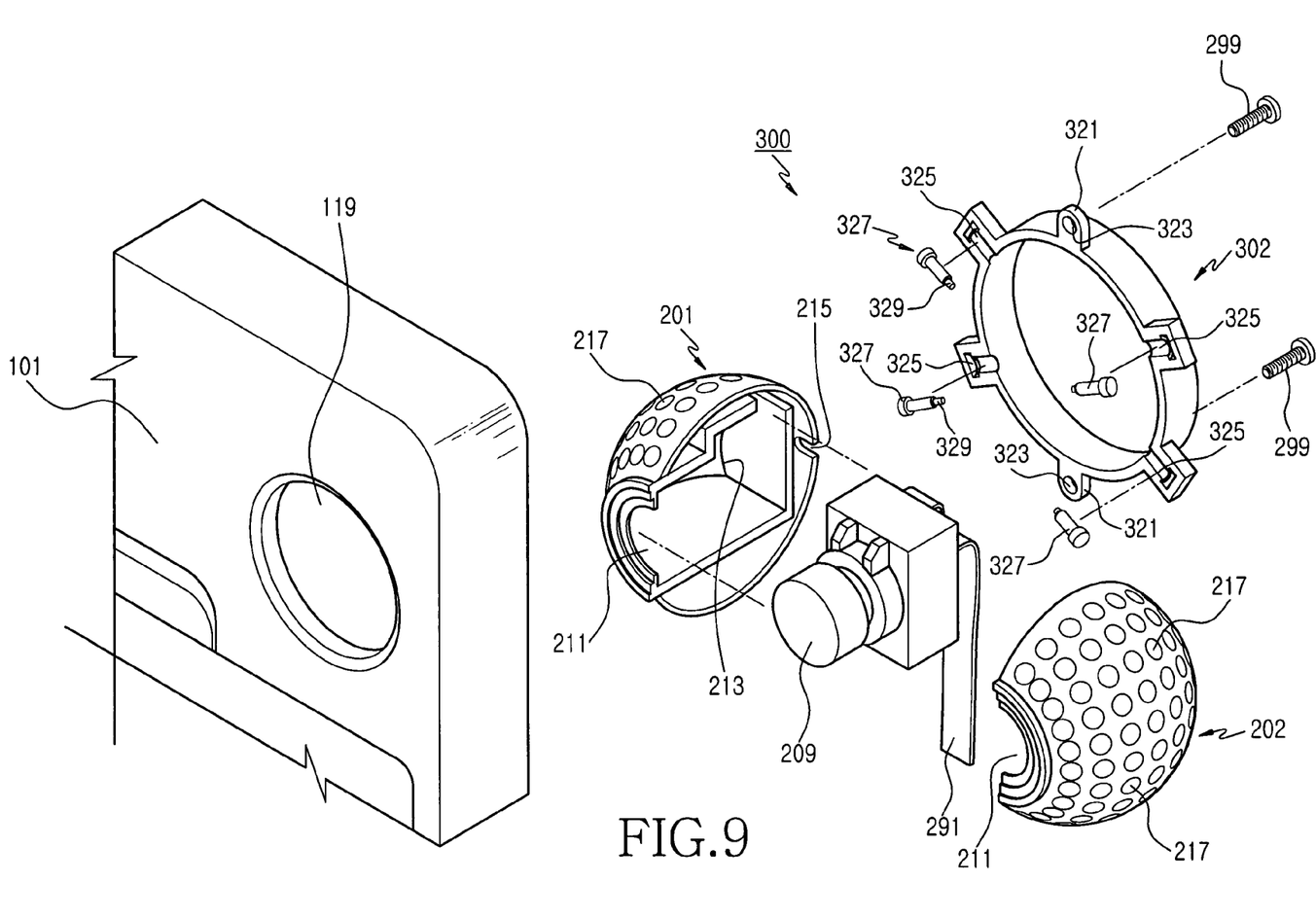
FIG. 9 is an exploded perspective view showing a camera lens assembly of a portable terminal according to another embodiment of the present invention.

FIG. 9 is an exploded perspective view showing a camera lens assembly 300 of a portable terminal according to another embodiment of the present invention. The same reference numerals are used to designate the same or similar components and a detailed description thereof will be omitted in order to avoid redundancy.

The cameral lens assembly 300 includes housing holder 302 having a substantially ring-shaped structure surrounding an outer peripheral portion of the lens housing 201 and is coupled to an inner portion of the portable terminal 101. The lens housing 101 is positioned in the opening 119 while being surrounded by the housing holder 302. The housing holder 302 includes tabs 321 extending from an outer peripheral portion of the housing holder 302 in a radially outward direction of the lens housing 201. The tabs 321 are formed with coupling holes 323 so that the housing holder 302 can be screw-coupled to the inner portion of the portable terminal 101 by means of screws 299. The housing holder 302 has stopper protrusions 329 which engage the stopper dimples 217 of the lens housing 201. The stopper protrusions 329 are formed at the ends of spring pins 327. A spring accommodated in the spring pin 327 applies a bias force to the stopper protrusion 329 so that the stopper protrusion 329 engages the stopper dimples 217 of the lens housing 201 while being moved in a radial direction of the lens housing 201. In order to install the spring pins 327, pin grooves 325 are formed in extension parts of the housing holder 302, which extend in a radial direction of the lens housing 201. The spring pins 327 are fixedly accommodated in the pin grooves 325 in such a manner that the stopper protrusions 329 protrude into an inner peripheral portion of the housing holder 302. Accordingly, when the user adjusts the exposure window 211 of the lens housing such that the exposure window 211 faces a photographing direction, the stopper protrusions 329 are engaged with the stopper dimples 217, thereby preventing the lens housing 201 from rotating. In addition, since the stopper protrusions 329 are engaged with the stopper dimples 217 by means of the biasing force of the spring pins 327, the user feels an improved click-stop sensitivity and can easily recognize a rotation angle of the lens housing 201.

As described above, the camera lens assembly according to the present invention is installed in the portable terminal so that the camera lens assembly is protected from damage by external impacts. In addition, the exposure window of the camera lens is rotatable within a predetermined angular range, so the camera lens assembly can photograph subjects at various camera angles. Furthermore, the camera lens assembly of the present invention has stopper dimples formed at an outer surface of the lens housing, which is rotated in the portable terminal, and stopper protrusions engage the stopper dimples under the influence of a bias force, so the lens housing can be prevented from rotating. In addition, the user feels an improved click-stop sensitivity when the lens housing rotates, so the user can conveniently use the camera lens assembly.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A camera lens assembly for a portable terminal, the camera lens assembly comprising:
a spherical lens housing having a camera lens therein and having formed on an outer peripheral portion thereof a plurality of stopper dimples, the lens housing having an exposure window for exposing the camera lens; and
a housing holder having a ring-shaped structure circumferentially surrounding the lens housing and coupled to an inner portion of the portable terminal, the housing holder including at least one stopper engaged with the stopper dimples by an elastic force, wherein the portable terminal has an opening for accommodating the exposure window, the housing holder is coupled to a peripheral portion of the opening, and the lens housing is rotatable within a predetermined angular range while being surrounded by the housing holder such that the stopper engages the stopper dimples, thereby fixing the exposure window at a plurality angles with respect to the opening.

2. The camera lens assembly as claimed in claim 1, wherein the exposure window is rotatable about the opening within an angle of 30° in any direction.

3. The camera lens assembly as claimed in claim 1, wherein the opening is formed at a rear portion of the portable terminal.

4. The camera lens assembly as claimed in claim 1, wherein the housing holder further includes at least one tab extending from an outer peripheral portion of the housing holder in a radial direction of the lens housing to couple the housing holder to the portable terminal.

5. The camera lens assembly as claimed in claim 1, wherein the housing holder further includes at least one elastic member extending so as to circumferentially surround the lens housing, and the stopper protrudes from an inner end portion of the elastic member so as to engage with the stopper dimples.

6. The camera lens assembly as claimed in claim 1, further comprising at least one pin groove extending from an outer peripheral portion of the housing holder in a radial direction of the lens housing, wherein the stopper includes a stopper pin fixedly accommodated in the pin groove and provided at an end portion thereof with a stopper protrusion, which is elastically engaged with the stopper dimples by an elastic force of a spring accommodated in the stopper pin.

7. The camera lens assembly as claimed in claim 1, wherein the camera lens includes a flexible printed circuit board, and a slit formed at an outer peripheral portion of the lens housing diametrically opposite to the exposure window so as to allow the flexible printed circuit board to pass therethrough.

8. The camera lens assembly as claimed in claim 1, wherein the stopper dimples are circumferentially aligned at an outer surface of the lens housing while forming a plurality of concentric patterns about the exposure window.

9. A camera lens assembly for a portable terminal, the portable terminal having an opening for exposing the camera lens assembly, the camera lens assembly comprising:
a spherical lens housing having a camera lens mounted therein and exposed through a window in the lens housing, an outer surface of the lens housing having a plurality of stopper dimples; and
a housing holder surrounding the lens housing to support the lens housing and being secured to an inner surface of the portable terminal, the housing holder including at least one stopper elastically engaging the stopper dimples,
wherein the window of the lens housing is positioned in the opening of the portable terminal, and the lens housing is movable within a predetermined range of movement in increments as the at least one stopper engages adjacent stopper dimples.

* * * * *